United States Patent [19]
Yamamoto

[11] Patent Number: 5,144,640
[45] Date of Patent: Sep. 1, 1992

[54] CORRELATION DEVICE FOR SPECTRUM SPREAD COMMUNICATION

[75] Inventor: Michio Yamamoto, Mobara, Japan
[73] Assignee: Futaba Denshi Kogyo K.K., Mobara, Japan
[21] Appl. No.: 648,297
[22] Filed: Jan. 31, 1991
[30] Foreign Application Priority Data
  Jan. 31, 1990 [JP] Japan .................................. 2-21044
[51] Int. Cl.$^5$ .............................................. H04K 1/10
[52] U.S. Cl. .......................................... 375/1; 380/34
[58] Field of Search ............................... 375/1; 380/34
[56] References Cited
  U.S. PATENT DOCUMENTS

| | | | |
|---|---|---|---|
| 4,149,121 | 4/1979 | Gordy et al. | 375/1 |
| 4,400,790 | 8/1983 | Chambers et al. | 375/1 |
| 4,707,839 | 11/1987 | Andren et al. | 375/1 |
| 4,730,340 | 3/1988 | Frazier et al. | 375/1 |
| 4,933,952 | 6/1990 | Albrieux et al. | 375/1 |
| 4,964,138 | 10/1990 | Nease et al. | 375/1 |
| 5,016,255 | 5/1991 | Dixon et al. | 375/1 |
| 5,022,047 | 6/1991 | Dixon et al. | 375/1 |
| 5,038,363 | 8/1991 | Mitsutsuka | 375/1 |

Primary Examiner—Thomas H. Tarcza
Assistant Examiner—David Cain
Attorney, Agent, or Firm—Oblon, Spivak, McClelland, Maier & Neustadt

[57] ABSTRACT

A correlation device for spectrum spread communication capable of being simplified in construction and carrying out high speed synchronism. The correlation device includes a code inversion device in place of a multiplier and a cumulative adder constituted by an adding section of two input terminals and a plurality of latch circuits.

4 Claims, 3 Drawing Sheets

CORRELATION DEVICE FOR SPECTRUM SPREAD COMMUNICATION

BACKGROUND OF THE INVENTION

This invention relates to a correlation device adapted to be used for spectrum spread communication which is utilized for radio controlling of a crane or the like, local communication, crosstalk-proof communication, and the like, and more particularly to a correlation device of a matched filter system.

Spectrum spread communication has been conventionally studied and partially put into practice in various fields such as crosstalk-proof communication, remote control, local area network and the like.

Conventionally, a direct spread (DS) system is used as one of systems for spectrum communication. In the DS system, it is required to attain synchronism between a transmission side and a receiving side in order to decode a signal received by the system.

Normally, correlation decode is carried out for decoding a spread signal and a delayed lock loop (DLL) system is used as one of systems used for this purpose. Unfortunately, the DLL system has disadvantages relating to time for the supplementing of synchronism and the stable operation. In view of the foregoing, attention is paid to a matched filter (adaptive filter) system recently.

For matched filtering are used a system of using a surface acoustic wave (SAW), a system of using a digital circuit and the like. The matched filter system exhibits advantages of permitting the high-speed synchronism, the stable operation and the like to be accomplished. However, the SAW system has a disadvantage of causing the attenuation of a signal during the transmission of the signal and the like.

A correlation operation using the matched filter is expressed by the following formula;

$$Y(n) = \sum_{k=0}^{N-1} d_k P_{(k+n)}$$

wherein $d_k$ indicates an input signal, $P_{(k+n)}$ indicates each of pits of a spread code, and N indicates a length of the spread code.

Thus, the above formula can be realized by carrying out the operation for summing products by the number of times N equal to the length of the spread code.

FIG. 3 shows a conventional matched filter wherein the above formula is realized by a digital circuit.

In FIG. 3, reference numeral 301 designates a shift register, 302 is each of multipliers and 303 is an adder. An input signal $V_i$ received from a transmission side is a signal formed by spreading a base band signal by means of a spread code and is supplied to the sift register 301 in order. Data $d_0$ to $d_N$ stored in the shift register 301 each are multiplied by a spread signal identical with that on the transmission side. More particularly, the data $d_0$ to $d_N$ are multiplied by pits $P_0$ to $P_N$ of the spread code by means of the multipliers 302, respectively. Then, they are subject to addition in the adder 303, so that a correlation output signal $V_O$ corresponding to the base band signal may be obtained.

The matched filter constructed as described above permits the high-speed synchronism to be carried out and the operation to be stabilized.

However, the matched filter includes N multipliers and the adder includes N taps, so that the matched filter is highly complicated in circuit construction, resulting in being expensive. Also, the matched filter of the digital system causes the operation speed of the multipliers to be restricted, to thereby fail to increase the processing speed.

SUMMARY OF THE INVENTION

The present invention has been made in view of the foregoing disadvantages of the prior art.

Accordingly, it is an object of the present invention to provide a correlation device for spectrum spread communication which is capable of permitting the high speed synchronism to be attained with a simple structure.

In accordance with the present invention, there is provided a correlation device for spectrum spread communication comprising an analog/digital converter for converting an input signal into a digital signal, a storage unit for storing an output signal of the analog/digital signal, a spread code generator for generating a spread code identical with that on a transmission side, an inversion unit for inverting an output signal of the storage unit in response to an output signal of the spread code generator, and an adder for cumulatively adding an output signal of the inverter.

In the correlation device for spectrum spread communication of the present invention constructed as described above, the spread code generator generates the same spread code as that on the transmission side and the inversion unit inverts the output signal of the storage unit in response to a signal of a predetermined voltage level in the spread code. The output signal of the inverter is cumulatively added, resulting in a correlation output signal being obtained.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a correlation device for spectrum spread communication according to the present invention will be described hereinafter with reference to FIGS. 1 and 2.

Figure 1:
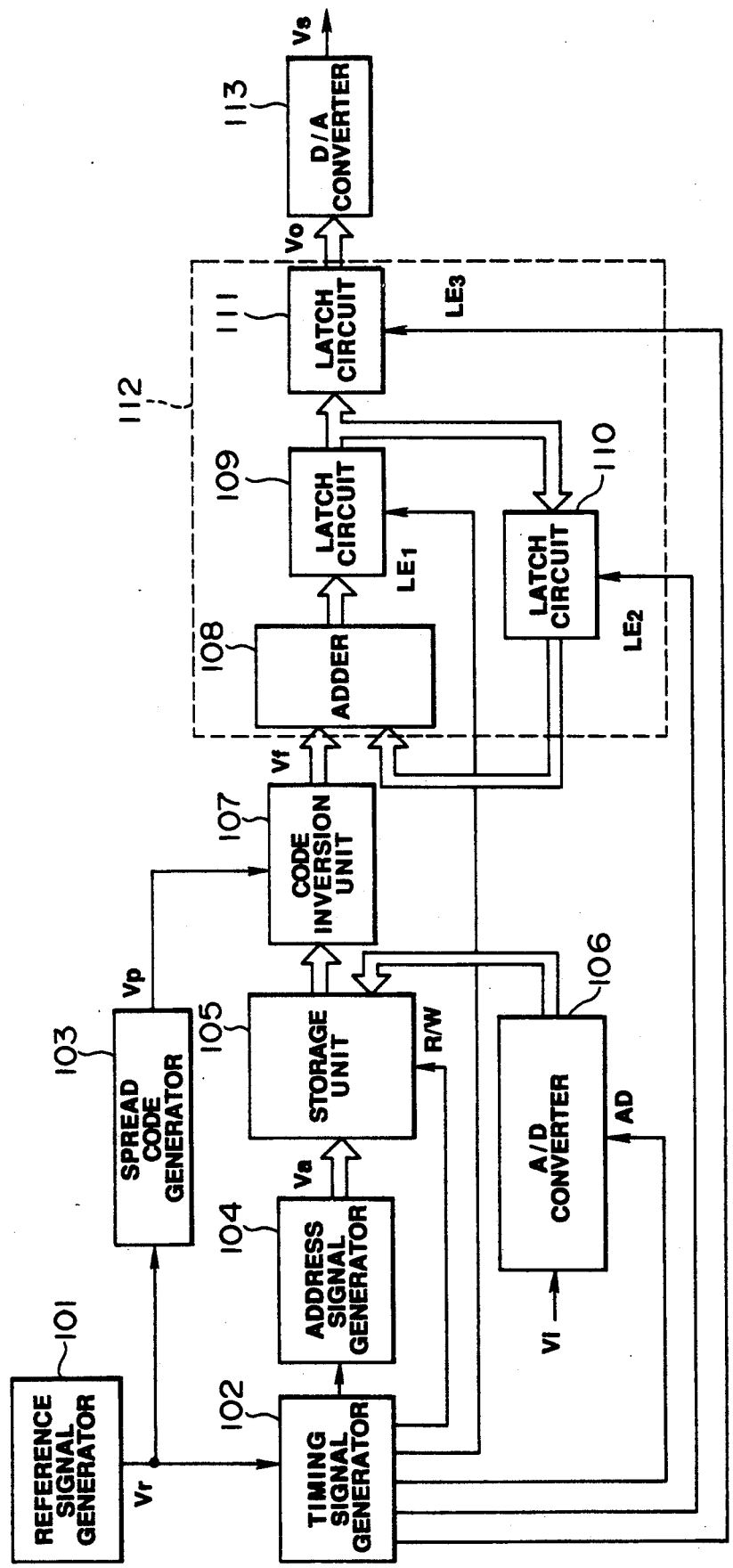
FIG. 1 is a block diagram showing an embodiment of a correlation device for spectrum spread communication according to the present invention.

FIG. 1 shows an embodiment of a correlation device for spectrum spread communication according to the present invention. In FIG. 1, a reference signal generator 101 generates a signal $V_r$ of a reference frequency, which is then supplied to a control terminal of a spread code generator 103 and a control terminal of a timing signal generator 102. The spread code generator 103 generates a spread code identical with that on a transmission side (not shown) in synchronism with the signal $V_r$. In general, a pseudo noise (PN) code is used as the spread signal. In the illustrated embodiment as well, a PN signal of the same cycle as that of a base band signal is used as the spread signal. The timing signal generator 102 is constituted by a counter or the like and adapted to count the signal $V_r$ to generate various kinds of timing signals. Reference numeral 104 designates an address signal generator 104 comprising an encoder. Equivalently, the address signal generator 104 comprises a program counter (PC) adapted to increase a count value for every cycle and an adder for counting a signal from the timing signal generator 102 to add an output signal from the PC. The so-constructed address signal generator 104 functions to encode a timing signal supplied from the timing signal generator 102 to a control terminal thereof in turn, to thereby generate an address signal $V_a$, which is then input to a storage unit 105 in turn.

An input signal $V_i$ which has been subject to processing such as frequency modulation (FM) in a receiving section (not shown) is supplied to an analog/digital (A/D) converter 106. The input signal $V_i$ is formed by spreading the base band signal by means of the spread code on the transmission side. To a control terminal of the A/D converter 106 is supplied a timing signal for controlling the A/D conversion operation of the A/D converter 106 from the timing signal generator 102. An output signal of the A/D converter 106 is supplied to the input terminal of the storage unit 105. The storage unit 105 stores the output signal of the A/D converter 106 therein in response to a read/write signal R/W supplied from the timing signal generator 102 and supplies it to a code inversion unit 107. The code inversion unit 107 may include various circuits such as a complement circuit for two or the like. The code inversion unit 107 functions to invert a signal from the storage unit 105 depending upon a voltage level of a spread signal $V_p$ from the spread code generator and supply it to one of input terminals of an adding section 108. Thus, the adding section 108 includes an adding circuit having two input terminals. An output signal of the adding section 108 is supplied to a latch circuit 109. An output signal of the latch circuit 109 is output in the form of a correlation output signal $V_O$ through a latch circuit 111. Also, the output signal is input through a latch circuit 110 to the other input terminal of the adding section 108. To a control terminal of each of the latch circuits 109 to 111 is input a timing signal from the timing signal generator 102. The adding section 108 and latch circuits 109 to 111 form a cumulative adder 112 in cooperation with each other. The correlation output signal $V_O$ generated from the latch circuit 111 is a digital signal; therefore, when an analog output signal is desired, a digital-/analog (D/A) converter 113 is provided for converting it into an analog signal, resulting in an analog output signal $V_s$ being obtained. When it is not required to convert it into an analog signal, the D/A converter 113 is eliminated.

Figure 2:
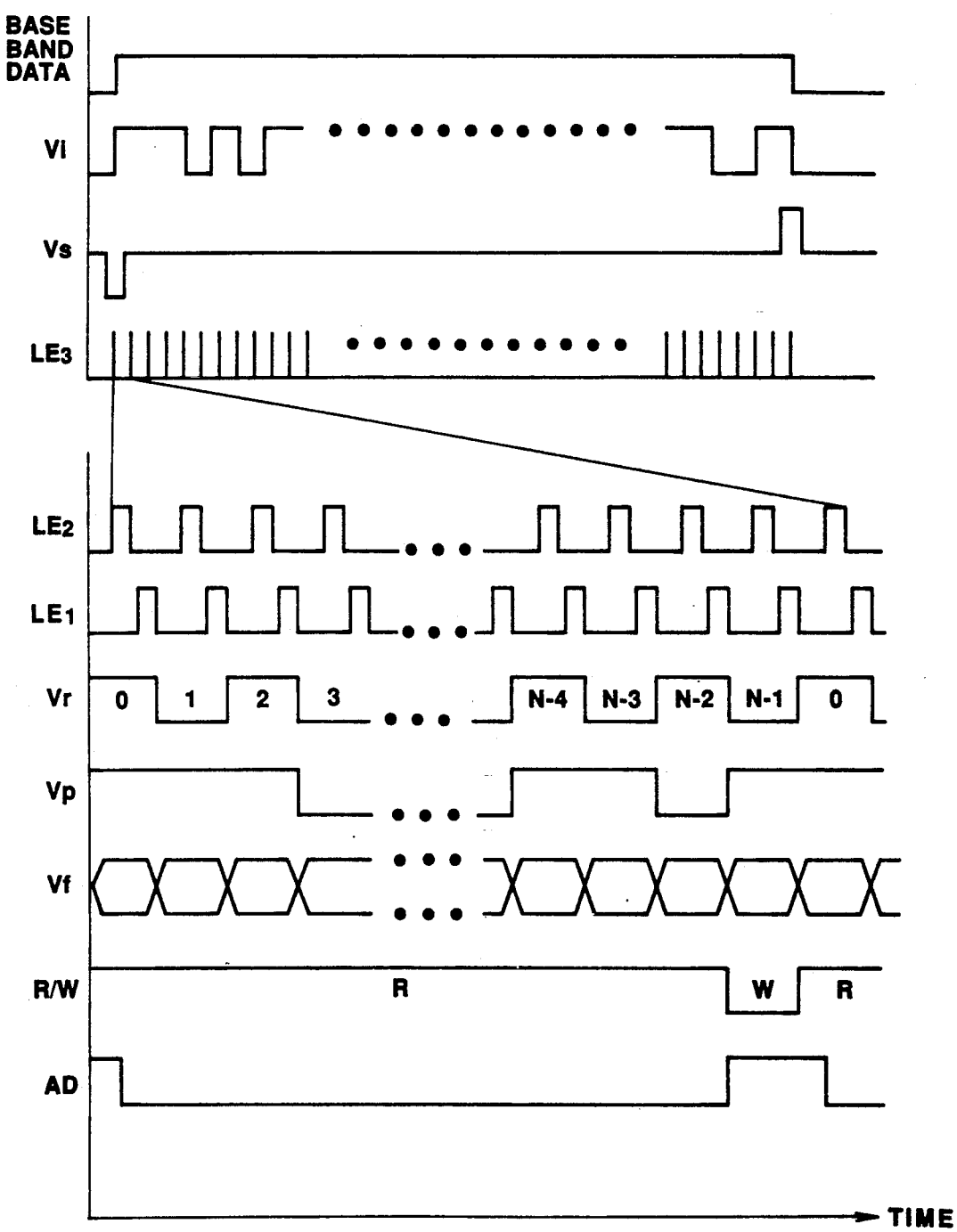
FIG. 2 is a timing chart of a circuit of the correlation device shown in FIG. 1.
Figure 3:
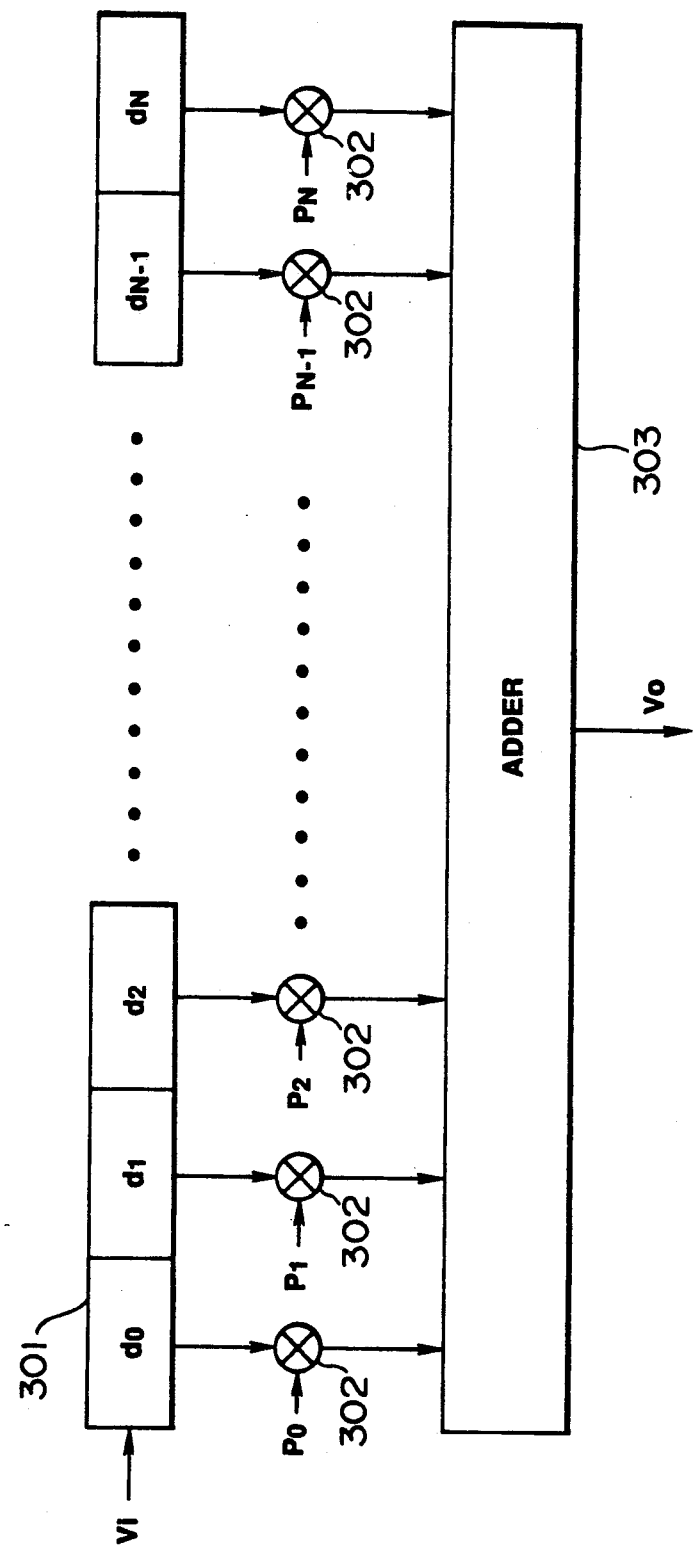
FIG. 3 is a block diagram showing a conventional correlation device.

Now, the manner of operation of the correlation device of the illustrated embodiment will be described hereinafter with reference to FIGS. 1 and 2, wherein FIG. 2 is a timing chart showing timings of the correlation device.

The timing signal generator 102 generates a read-/write signal R/W, a timing signal AD for A/D conversion, latch control signals $LE_1$-$LE_3$, and the like at timings shown in FIG. 2 in response to the output signal $V_r$ of the reference signal generator 101. The A/D converter 106 converts the input signal $V_i$ into a digital signal in response to the leading of the timing signal AD after sampling it, which is then supplied to the input terminal of the storage unit 105. The A/D converter 106 converts each of pits of the input signals $V_i$ into a digital signal n times. In the illustrated embodiment, each pit is converted two times while being shifted by a half cycle.

When the signal R/W is a write signal W, the storage unit 105 stores, in an address corresponding to the address signal $V_a$, the digital signal from the A/D converter 106. As described above, each pit of the input signal $V_i$ is converted into a digital signal two times while being shifted by a half cycle; therefore, supposing that the length of pit of the input signal $V_i$ is N, 2N signals are stored for every pit length. At the time when the storage unit 105 carries out the operation for summing products of one date as described hereinafter, data for N times before the operation are stored in the storage unit 105.

Then, when the signal R/W is a read signal R, signals in odd numbers are supplied from the storage unit 105 to the code inversion unit 107 in a first-in first-out (FIFO) way in turn in response to the address signal $V_a$. The spread code generator 103 supplies the spread code $V_p$ to the control terminal of the code inversion unit 107 in response to the signal $V_r$. The code inversion unit 107 does not invert the signal from the storage unit 105 when the voltage level of the spread code $V_r$ is 1; whereas it inverts it when the voltage level is 0, which is then output in turn. This results in the multiplying operation being carried out. An output signal $V_f$ of the code inversion unit 107 is input to the one input terminal of the adding section 108. The adding section 108 adds the signals input to both input terminals thereof and the resultant signal is then supplied to the latch circuit 109. The latch circuit 109 latches the input signal in response to the leading of the latch signal $LE_1$ from the timing signal generator 102 and then supplies the latched signal to each of the latch circuits 110 and 111. The latch circuit 110 latches the signal input thereto in response to the leading of the latch signal $LE_2$ and then supplies the latched signal to the other input terminal of the adding section 108. The latch circuit 111 latches the input signal in response to the leading of the latch signal $LE_3$ and outputs the correlation output signal $V_O$. The correlation output signal $V_O$ is converted into the analog output signal $V_s$ in the D/A converter 113. The adding section 108 and latch circuits 109 to 111 repeat the above-described operations at the timings shown in FIG. 2, resulting in the signal $V_f$ being cumulatively added.

The cycle of the latch signal $LE_3$ corresponds to a period of time during which the operation of summing products of one data is carried out. During the period, the operation of summing products of one data is carried out N times depending upon the output signal $V_r$ of the reference signal generator 101.

A timing 0 of the signal $V_r$ indicates data prior to N samplings of data currently input. The operation of summing products of one data is initiated at the timing 0. After processing of the signals in odd numbers is completed as described above, the same processing is carried out on signals in even numbers, resulting in one cycle operation being completed.

The correlation operation processing is carried out on the signals in both odd and even numbers. Thus, even when the phases of the PN signal $V_p$ and the PN code of the signal $V_i$ are shifted from each other by a half cycle, each of them is synchronized with any one of the signals in odd or even numbers, so that the high speed synchronism may be ensured.

Sampling of a new data is carried out at a timing (N−1) and then the same operation is carried out.

The above-described operation is carried out on a non-synchronous correlation operation while shifting the phase by one data for every cycle. More particularly, the next cycle is carried out from a timing 1 of the signal $V_r$ to its timing 0. The above-described operation for shifting the phases of the data is realized by increasing the PC in the address signal generator 104 by one for every cycle and shifting the address signal $V_a$ by one address.

In connection with the correlation output signal $V_O$, a positive peak value is generated when synchronism of the spread code is accomplished and a negative peak value is generated when reverse correlation occurs. Accordingly, in connection with the signal $V_s$, such positive and negative peak signals as shown in FIG. 2 are obtained at positions corresponding to the timings when the positive and negative peak values of the correlation output signal are generated. The cycles of the base band data and PN code are rendered identical with each other, so that the positive peak corresponds to the trailing edge of the base band data, resulting in the synchronism being accomplished at this point.

In the illustrated embodiment, the correlation operation processing is carried out on the signals in odd and even numbers. Therefore, even when the PN signal $V_p$ and the PN code of the signal $V_i$ are shifted in phase by a half cycle, each of them is synchronized with any one of the signals in odd or even numbers, to thereby accomplish the high speed synchronism. However, this may be eliminated to simplify the circuit construction when further high speed synchronism is not desired.

Also, the D/A converter 113 may be eliminated when it is not required to convert the output signal into an analog signal.

As noted from the above, the illustrated embodiment uses the code inversion unit 107 in place of a conventional multiplier, resulting in the construction being simplified to lead to the high speed processing.

In addition, the illustrated embodiment permits an adder of less terminals to be realized, because the adding section 108 of two input terminals and a plurality of the latch circuits 109 to 11 cooperate to form the cumulative adder 112.

Moreover, the illustrated embodiment decreases cumulative delay of the circuit due to its simple circuit construction, to thereby accomplish the high speed processing.

Furthermore, the non-synchronous operation of the digital system is carried out, therefore, the operation is highly stabilized and the high speed synchronism is attained.

As can be seen from the foregoing, the correlation device of the present invention is constructed so as to carry out the operation of summing products by means of the inversion unit and adder without using a conventional multiplier, resulting in being highly simplified in construction. The simplification of the construction causes cumulative delay of the circuit to be reduced, leading to the high speed processing. In addition, the non-synchronous operation of the digital system is carried out, therefore, the operation is highly stabilized and the high speed synchronism is attained.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A correlation device for spectrum spread communication comprising:
    a reference signal generator for generating a signal of reference frequency;
    a timing signal generator for generating a first timing signal, a second timing signal, a third read/write timing signal, and a fourth latch control timing signals in response to said signal of said reference signal generator;
    an address signal generator for encoding said first timing signal of said timing signal generator to generate an address signal;
    an analog/digital converter for converting an input signal formed by spreading a base band signal by means of a spread code on a transmission side and modulated in a receiving side into a digital signal in response to leading of said second timing signal of said timing signal generator;
    a storage unit for storing an output signal of said analog/digital converter in response to said read/write timing signal of said timing signal generator;
    a spread code generator for generating a spread code identical with said spread code on said transmission side in synchronism with said signal of reference signal generator;
    means for inverting an output signal of storage unit in response to a voltage level of an output signal of said spread code generator; and
    means for cumulatively adding an output signal of said inversion means.

2. A correlation device for spectrum spread communication as defined in claim 1, wherein said inversion means is formed of a two complement circuit.

3. A correlation device for spectrum spread communication as defined in claim 1, wherein said cumulative adder includes an adding circuit having two input terminals and a plurality of latch circuits.

4. A correlation device for spectrum spread communication as defined in claim 3, wherein said latch circuit comprises a first latch circuit, a second latch circuit, and a third latch circuit, said first latch circuit latching an input signal in response to leading of said latch signal of said timing signal generator and applying said latched signal to said second and third latch circuits, said second latch circuit latching an input signal in response to leading of said latch signal of said timing signal generator and applying said latched signal to said adding circuit, and said third latch circuit latching an input signal in response to leading of said latch signal of said timing signal generator and generating a correlation output signal.

* * * * *